UNITED STATES PATENT OFFICE.

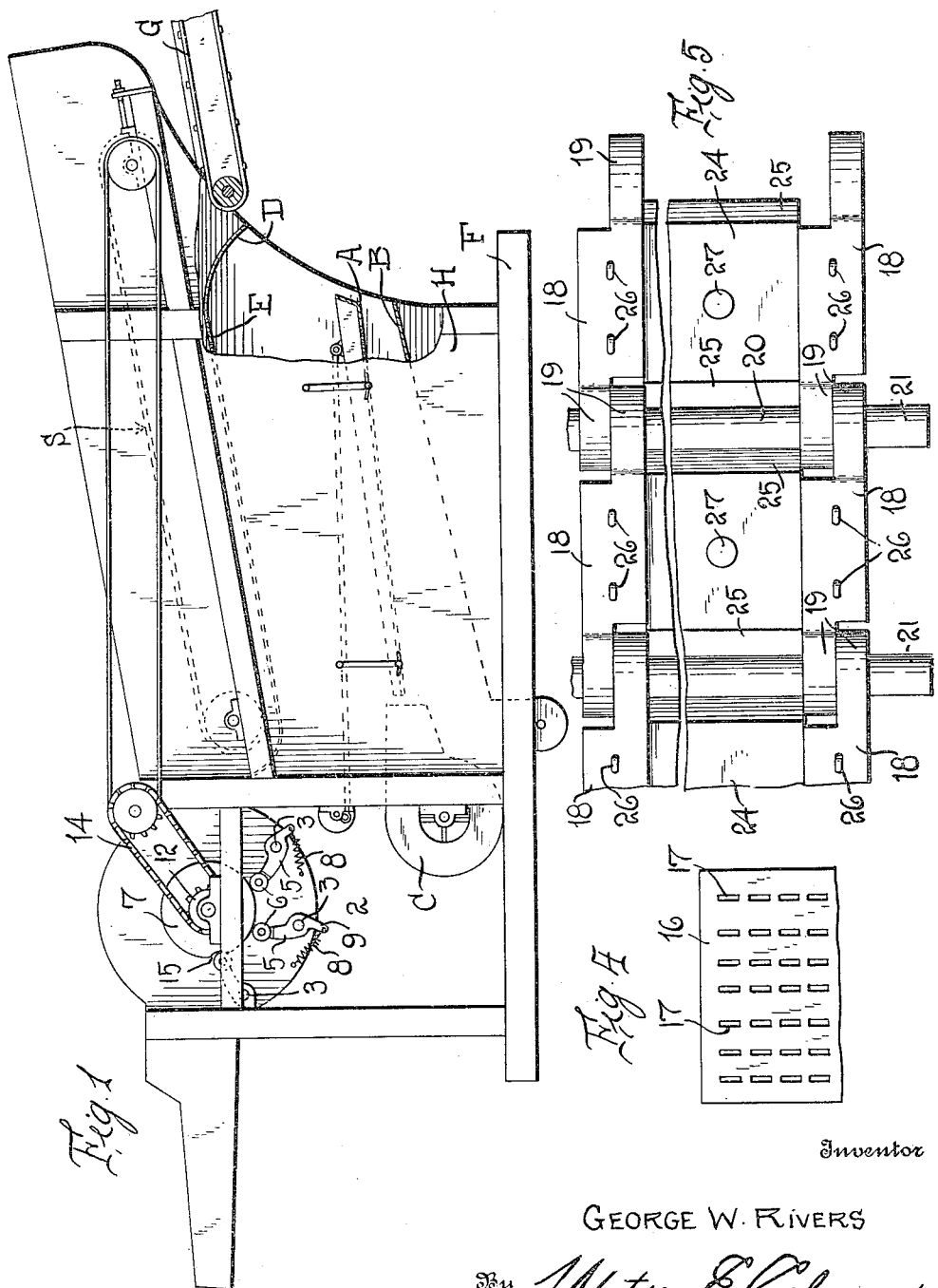
G. W. RIVERS.
THRESHING MACHINE.
APPLICATION FILED JULY 5, 1916.
1,204,191.
Patented Nov. 7, 1916.
2 SHEETS—SHEET 1.
Inventor
GEORGE W. RIVERS
By Watson E. Coleman
Attorney

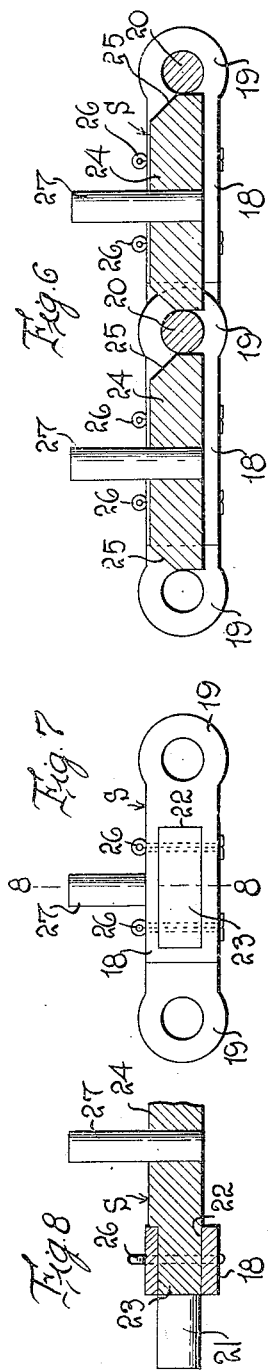
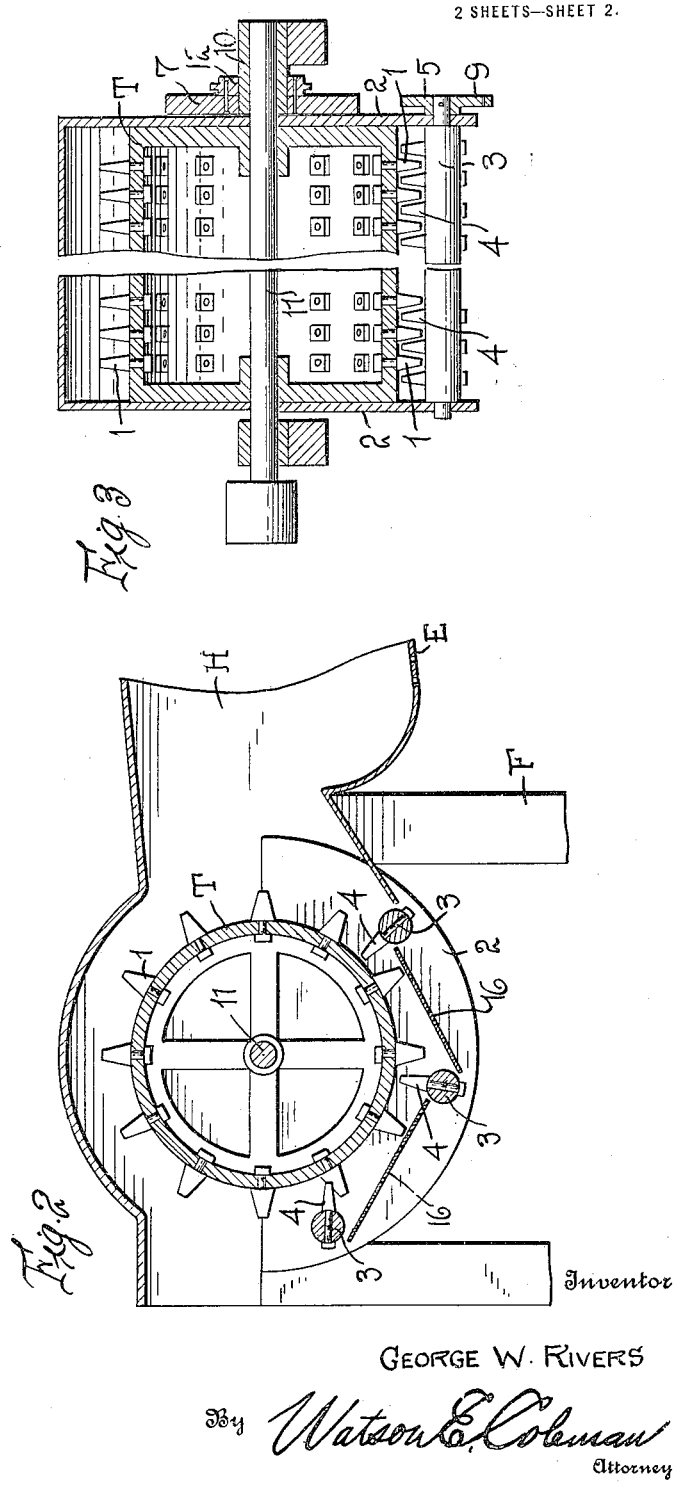

GEORGE W. RIVERS, OF ABERDEEN, NORTH CAROLINA, ASSIGNOR TO CHARLES N. BRASINGTON, OF BENNETTSVILLE, SOUTH CAROLINA.

THRESHING-MACHINE.

1,204,191.  Specification of Letters Patent.  Patented Nov. 7, 1916.

Application filed July 5, 1916. Serial No. 107,561.

*To all whom it may concern:*

Be it known that I, GEORGE W. RIVERS, a citizen of the United States, residing at Aberdeen, in the county of Moore and State of North Carolina, have invented certain new and useful Improvements in Threshing-Machines, of which the following is a specification, reference being had to the accompanying drawings.

This invention relates to certain improvements in threshing machines and has relation more particularly to a machine of this general character especially designed and adapted for use in connection with pea vines or the like; and it is an object of the invention to provide a novel and improved device whereby dirt or the like is effectively separated from the straw and whereby the possibility of the straw interfering with the operation of any of the movable parts of the machine is substantially entirely eliminated.

It is also an object of the invention to provide a threshing machine including a novel and improved concave wherein the teeth are capable of rocking movement in the same general direction as the travel of the vines or straw so that the possibility of fibrous matter collecting thereon is eliminated.

It is also an object of the invention to provide novel and improved means whereby said teeth may be automatically operated.

The invention has for a further object to provide a threshing machine including a novel and improved straw carrier wherein the possibility of fibrous matter being collected and held between the cross slats or members is avoided, and wherein said carrier is substantially continuous at all points.

The invention has for a still further object to provide a novel and improved threshing machine provided with means whereby the screenings as forced out through the medium of an air blast or the like are prevented from being returned to the straw after the straw has been discharged from the carrier.

The invention consists in the details of construction and in the combination and arrangement of the several parts of my improved threshing machine whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in elevation with parts in section illustrating a threshing machine constructed in accordance with an embodiment of my invention, the wall supporting structure being omitted; Fig. 2 is an enlarged fragmentary vertical sectional view taken through the threshing cylinder and the parts adjacent thereto and illustrating certain details of my invention as herein embodied; Fig. 3 is a longitudinal sectional view taken through the threshing cylinder and its adjacent parts, the intermediate portion being broken away; Fig. 4 is a fragmentary view in top plan of one of the screening elements included in the concave; Fig. 5 is a fragmentary view in top plan of the straw carrier as herein embodied; Fig. 6 is a fragmentary longitudinal sectional view taken through one of the stretchers of the straw carrier; Fig. 7 is an end elevational view of one of the links and cross slats as herein included; and Fig. 8 is a sectional view taken substantially on the line 8—8 of Fig. 7.

As disclosed in the accompanying drawings, F denotes a frame of conventional construction upon which is mounted the housing H of a well known type and which includes the screening element E with which coacts the straw carrier indicated in its entirety by S, said carrier being driven in any desired manner and of an endless type. The peas or grain passing through the screening element E are received by the shaker screen A operated in a conventional manner and pass from said shaker A to the collecting apron B in a well known manner.

C denotes a fan directing its blast rearwardly and beneath the screening element E for a well know purpose, and as is particularly illustrated in Fig. 1, it is to be noted that the rear end of the screening element E is provided with an imperforate extension D which bridges the space between the screening element E and the discharge conveyer G so that the dirt or other material blown out by the action of the fan C will not be returned to the straw as the same is delivered by the carrier S upon the conveyer G.

T denotes a threshing cylinder of any ordinary or preferred construction and which has radiating therefrom the teeth 1. The threshing cylinder T coacts with the concave herein disclosed as comprising the suitably supported end plates 2 and which have mounted therebetween the rock shafts 3 disposed longitudinally of the threshing cylinder T and disposed in predetermined spaced relation. Extending from each of the shafts 3 are the teeth 4 which are normally disposed toward the threshing cylinder T in such a manner as to effectively coöperate with the teeth 1 to act upon the straw or vines as fed to the threshing cylinder T for a well known purpose. Corresponding ends of the shafts 3 extend through the adjacent end plate 2 as is particularly illustrated in Fig. 3, and affixed to the extended portion of each of said shafts 3 is a rock arm 5 extending inwardly of the plate 2 and having its free extremity provided with a roller 6 which is constantly maintained in contact with the periphery of the circular disk 7 through the medium of the retractile member 8. The retractile member 8 is herein disclosed as a conventional coil spring having one extremity operatively engaged with a tail 9 carried by each of the arms 5 and disposed in a direction opposite thereto, while the opposite end portion of the retractile member 8 is anchored to the plate 2 at a point in advance thereof.

The disk 7 is mounted for movement independently of the threshing cylinder T and as is particularly illustrated in Fig. 3, is loosely mounted upon one of the bearings 10 for the shaft 11 of the threshing cylinder T. Suitably affixed to the disk 7 to rotate therewith is the sprocket wheel 12 which is adapted to be connected, as at 14, with a suitable source of power and preferably a movable part of the threshing machine proper. The disk 7 is provided in its periphery with a recess or depression 15 adapted to receive the roller 6, as is believed to be fully shown in Fig. 1, whereby it will be perceived that the shafts 3 will be permitted to intermittently rock in a direction transversely of the threshing cylinder T or in the same direction as the travel of the straw or vines. This movement of the shafts 3 results in a corresponding movement of the teeth 4 and this movement of the teeth 4 is of material advantage as it prevents the accumulation upon said teeth of any fibrous matter. It will be at once self-evident that should any portion of the straw or vines wind about the teeth, the same will be drawn therefrom upon the movement of the teeth in the direction of travel of the straw or vines, as is believed to be self-evident and whereby choking or other interference with the operation of the threshing cylinder is eliminated.

Interposed between each of the adjacent shafts 3 is a screening element 16, as illustrated in detail Fig. 4 of the accompanying drawings, and it is also preferred that the perforations or openings 17 therein be rectangular and disposed longitudinally of the threshing cylinder T. It is also to be particularly noted in Fig. 2 that the inner margin of each of the elements 16 is positioned adjacent the upper portion of the inner shaft 3 between which it is interposed and has its outer or opposite margin arranged below the outer shaft 3. By this assemblage the action of the threshing cylinder T upon the vine or straw serves to force through said screening element 16 the major portion of the dirt or the like which may be carried by the vines or straw as delivered to the threshing cylinder T.

As disclosed particularly in Figs. 5 to 8 of the accompanying drawings, the straw carrier S comprises two endless side chains adapted to be disposed around suitable sprockets positioned within the housing H and each of said endless members comprises a plurality of links 18 provided at their opposite ends with the periphery extensions 19 adapted to overlap corresponding extensions of the adjacent links. Disposed through the overlapping extensions 19 are the bars 20 which are common to both of the endless members and which extend therebeyond, as indicated at 21, to afford teeth coacting with the sprockets hereinbefore referred to, and whereby the requisite travel and movement may be imparted to the carrier S. The intermediate portion of each of the links 18 is slotted, as at 22, to receive the reduced extremity 23 of a cross slat 24 and which is of a width equal to the space between the adjacent bars 20 with its longitudinal marginal portions in contact with said bars. It is also to be particularly noted that the upper longitudinal portions of each of the slats 24 are beveled, as at 25, so that no obstruction will be offered to the vine or straw coacting with the carrier S. It will also be observed that by having the slats 24 directly in contact with the bars 20, the possibility of the vine, straw or other fibrous matter winding around said bars 20 is effectively prevented. This is a decided improvement in threshing machines as it has been fully demonstrated in practice that a straw carrier constructed in this particular manner entirely avoids this pronounced disadvantage. It is also noted that the bars 20 are circular in cross section so that requisite relative movement may be had between the adjacent slats 24 as the conveyer is passing around its supporting pulleys.

The slats 24 may be maintained in applied position in any desired manner but as herein disclosed I provide the cotter pins 26 which are directed through the intermediate portions of the links 18 and the reduced extremities 23. The slats 24 are also provided with the laterally extending fingers or pins 27 for a purpose which is believed to be clearly apparent to those skilled in the art to which my invention appertains.

From the foregoing description, it is thought to be obvious that a threshing machine constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In a threshing machine, a concave including a rock shaft, teeth extending therefrom, and means for intermittently rocking the shaft.

2. In a threshing machine, a concave including a rock shaft, teeth extending therefrom, means for intermittently rocking the shaft, and means for normally maintaining the teeth in substantially a vertical position.

3. In a threshing machine, a concave including a plurality of teeth mounted for rocking movement, and automatic means for intermittently rocking the teeth.

4. In a threshing machine, a concave including a rock shaft, teeth extending therefrom, a rock arm fixed to the shaft, a driven cam, means for maintaining the arm in engagement with the cam, said cam and last named means serving to intermittently rock the shaft.

5. In a threshing machine, a concave including a rock shaft, teeth extending therefrom, a rock arm fixed to the shaft, a driven disk provided in its periphery with a recess, and means for constantly maintaining the rock arm in contact with the periphery of the disk, said recess and last named means serving to intermittently rock the shaft.

6. In combination with a threshing cylinder, a concave coacting therewith and including a rock shaft disposed longitudinally thereof, teeth extending from the shaft and coacting with the cylinder, and automatic means for intermittently rocking the shaft.

7. In a threshing machine, a threshing cylinder, rock shafts disposed therealong, fingers carried by said shafts and normally disposed toward the threshing cylinder, automatic means for rocking the shafts, and perforate elements interposed between the shafts, said elements being angularly disposed relative to the plane occupied by adjacent shafts.

8. In a threshing machine, a threshing cylinder, rock shafts disposed therealong, fingers carried by said shafts and normally disposed toward the threshing cylinder, automatic means for intermittently rocking the shafts, and perforate elements interposed between the shafts.

In testimony whereof I hereunto affix my signature in the presence of two witnesses.

GEORGE W. RIVERS.

Witnesses:
W. E. LAWSON,
J. M. BRASINGTON.

Copies of this patent may be obtained for five cents each, by addressing the "Commissioner of Patents, Washington, D. C."